United States Patent [19]

Jonnalagadda et al.

[11] Patent Number: 5,909,253
[45] Date of Patent: Jun. 1, 1999

[54] REDUCING VIDEO CROSSTALK IN A DATA CARRIER LOCATED WITHIN A VESTIGIAL SIDEBAND OF A STANDARD TELEVISION SIGNAL

[75] Inventors: Krishnamurthy Jonnalagadda, Plainsboro; Liston Abbott, East Windsor, both of N.J.

[73] Assignee: Sarnoff Corporation, Princeton, N.J.

[21] Appl. No.: 08/987,488

[22] Filed: Dec. 9, 1997

[51] Int. Cl.⁶ .......................... H04N 5/208; H04N 5/213; H04N 5/21

[52] U.S. Cl. .......................... 348/608; 348/607; 348/473; 348/424; 348/723

[58] Field of Search ................................. 348/607, 608, 348/609, 473, 486, 424, 425, 426, 427, 428, 429, 470, 723, 724, 613; H04N 5/208, 5/213, 5/21

[56] References Cited

U.S. PATENT DOCUMENTS

| | | | |
|---|---|---|---|
| 4,162,304 | 7/1979 | Faroudja | 358/37 |
| 4,882,725 | 11/1989 | Noda | 370/11 |
| 4,907,218 | 3/1990 | Inoue | 370/20 |
| 4,918,515 | 4/1990 | Faroudja | 348/613 |
| 4,944,032 | 7/1990 | Kageyama | 358/12 |
| 4,958,230 | 9/1990 | Jonnalagadda | 358/186 |
| 5,029,003 | 7/1991 | Jonnalagadda | 358/142 |
| 5,063,446 | 11/1991 | Gibson | 358/142 |
| 5,079,633 | 1/1992 | Hagino | 348/613 |
| 5,177,611 | 1/1993 | Gibson | 358/167 |
| 5,430,487 | 7/1995 | Naimpally | 348/429 |
| 5,629,739 | 5/1997 | Dougherty | 348/486 |
| 5,646,698 | 7/1997 | Yang | 348/475 |

OTHER PUBLICATIONS

National Association of Broadcasters (NAB) submission of Dec. 17, 1996 entitled "D–Channel Signal Specification".
National Association of Broadcasters (NAB) submission of Apr. 30, 1994 entitled Response to RFP "NTSC–Compatible Data Broadcasting Systems".
National Association of Broadcastiers (NAB) submission of Jul. 3, 1996 entitled "Description of D–Channel Implementations".

*Primary Examiner*—John K. Peng
*Assistant Examiner*—Wesner Sajous
*Attorney, Agent, or Firm*—William J. Burke

[57] ABSTRACT

A method and apparatus for reducing video crosstalk in a data carrier located within a lower vestigial sideband (VSB) of a standard television signal. Specifically, an apparatus according to the invention comprises a single bandpass filter for conditioning a VSB television signal, and a frequency interleaver for spectrally adding the data carrier to the lower VSB of the standard VSB video signal. The filter removes removing video components from the lower VSB of a standard VSB video signal, including frequencies greater than the highest frequency nominally associated with the lower VSB of the standard television signal, illustratively 250 Khz above the nominal VSB bandedge. The filter also boosts frequencies in a spectral boost region within a passband for boosting region. The boosted frequencies comprise image frequencies associated with the non-VSB spectrum attenuated by the filter. The compensation is required to ensure that the above image frequencies are not over-attenuated by a standard television receiver Nyquist filter.

7 Claims, 2 Drawing Sheets

REDUCING VIDEO CROSSTALK IN A DATA CARRIER LOCATED WITHIN A VESTIGIAL SIDEBAND OF A STANDARD TELEVISION SIGNAL

The invention relates to a method and apparatus for reducing video crosstalk in a data carrier located within a vestigial sideband of a standard television signal.

BACKGROUND OF THE DISCLOSURE

Data may be transmitted as a sub-carrier in the lower vestigial sideband (VSB) spectral region of a standard television signal, e.g., a National Television Standards Committee (NTSC) broadcast video signal. Normally the standard television signal is generated by double sideband modulating a radio frequency (RF) picture carrier with a baseband composite video signal and thereafter vestigial filtering the modulated signal to remove the majority of the lower sideband. The vestigial sideband, which nominally extends to 1.25 MHz below the picture carrier, contains low frequency luminance information. This low frequency luminance information within the vestigial sideband is duplicated by low frequency luminance information within the television signal extending from the picture carrier to 1.25 MHz above the picture carrier. It has been determined that a portion of the luminance information in the vestigial sideband may be replaced with auxiliary digital audio information or other information without significantly affecting the video signal recovered by a receiver. The other information may comprise, e.g., a quadrature phase shift keying (QPSK) modulated data signal.

K. Jonnalagadda, in U.S. Pat. No. 5,029,003, discloses an apparatus for removing video signal from a portion of the vestigial sideband of a television signal and inserting a digital audio signal therein. Unfortunately, the disclosed apparatus is susceptible to the introduction of errors in the inserted digital audio signal due to video crosstalk.

Therefore, it is seen to be desirable to provide a video crosstalk resilient apparatus and method for inserting data as a sub-carrier in the lower VSB spectrum region of a television signal.

SUMMARY OF THE INVENTION

The invention is a method and apparatus for reducing video crosstalk in a data carrier located within a lower vestigial sideband of a standard television signal.

Specifically, an apparatus according to the invention comprises a filter, for attenuating video components in at least a lower VSB portion of a standard video signal, including video components having image frequencies spectrally located within an attenuation band of a standard television receiver Nyquist filter. The filter also boosts image frequencies of the frequencies spectrally located within an attenuation band of the standard television receiver Nyquist filter so that the Nyquist filter will not over-attenuate these frequencies. A frequency interleaver is coupled to the filter and spectrally adds a data carrier to the lower VSB of the standard video signal.

A method according to the invention comprises the steps of attenuating, using a filter, video frequency components in at least a lower VSB portion of a standard video signal, including video frequency components having image frequency components spectrally located within an attenuation band of a standard television receiver Nyquist filter; boosting, using the filter, the image frequency components spectrally located within an attenuation band of the Nyquist filter by an amount proportional to the attenuation by the Nyquist filter; and spectrally adding a data carrier to the lower VSB of the standard video signal.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

The invention will be described within the context of an NTSC television system. It will be apparent to one of ordinary skill in the art that the invention is also applicable to PAL and SECAM systems.

Figure 2:
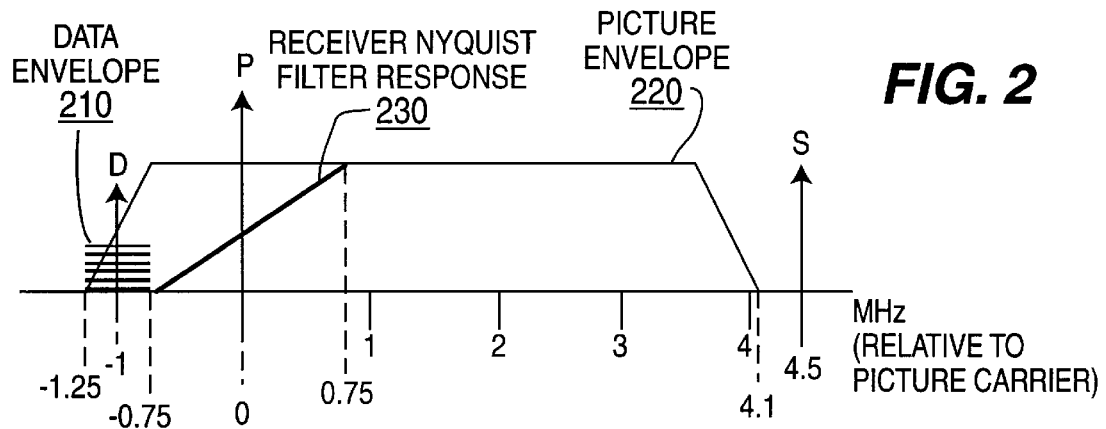
FIG. 2 is a spectral diagram of a television signal having a data carrier located within a vestigial sideband region.

FIG. 2 is a spectral diagram of a television signal having a data carrier located within a vestigial sideband region. Specifically, FIG. 2 depicts the relative spectral characteristics of a baseband video signal including a picture carrier P, a sound carrier S having a frequency 4.5 MHz above the picture carrier frequency, and a data carrier D having a frequency 1.0 MHz below the picture carrier frequency. Data, which has been modulated onto the data carrier D, occupies the shaded spectral region denoted as DATA ENVELOPE 210. Picture information, which has been modulated onto the picture carrier, occupies the delineated spectral region denoted as PICTURE ENVELOPE 220.

The data within the data envelope 210 is quadrature phase shift keying (QPSK) encoded data. However, since the data encoding technique employed is not critical to the invention, other encoding techniques, such as duo-binary encoding, may be used. The baseband television signal depicted in FIG. 2 is modulated onto a radio frequency (RF) carrier and transmitted by a transmitter in a known manner.

FIG. 2 also depicts a portion of the filter response 230 of a Nyquist bandpass filter commonly used in a television receiver. Specifically, the receiver Nyquist filter has a lower bandedge which begins rolling off at a frequency 0.75 MHz above the picture carrier frequency, provides 3 dB attenuation at the picture carrier frequency, and fully attenuates all frequencies more than 0.75 MHz below the picture carrier frequency. It should be noted that the picture envelope 220 extends to approximately 0.75 MHz below the picture carrier before rolling off. Thus, the Nyquist filter is the only attenuating filter operative upon the received picture envelope 220. The relationship between the receiver Nyquist filter and the picture envelope will be discussed in more detail below.

Figure 1:
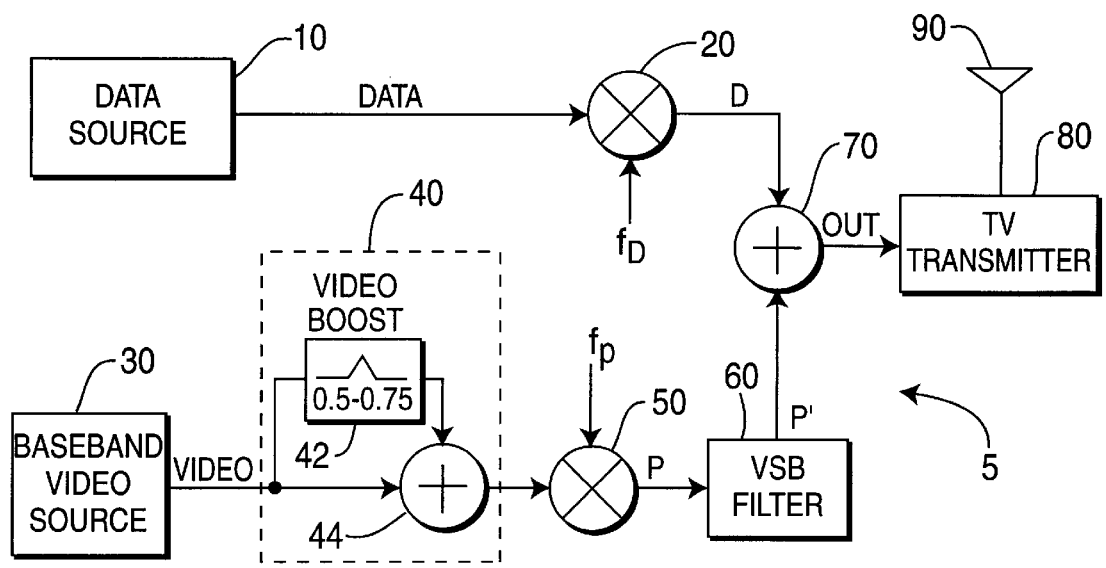
FIG. 1 is a block diagram of an apparatus embodying the invention for spectrally locating a data signal within a lower VSB region of a television signal.

FIG. 1 is a block diagram of an apparatus 5 embodying the invention for spectrally locating a data signal within a lower VSB region of a television signal. A data source 10 provides a data signal DATA, illustratively a QPSK encoded data signal having a bandwidth of 750 KHz, to a first input of a first mixer 20. A frequency source (not shown) produces a data carrier signal having a frequency $f_D$. The data carrier signal is coupled to a second input of the first mixer 20. First mixer 20 mixes the data signal DATA with the data carrier signal to produce an output data signal D. The output data signal D is coupled to a first input of a frequency interleaver 70.

A baseband video source 30 provides a baseband video signal VIDEO, illustratively an NTSC composite video signal, to a first input of a second mixer 50. A frequency source (not shown) produces a picture carrier signal having a frequency $f_P$. The picture carrier signal is coupled to a second input of the second mixer 50. Second mixer 50 mixes the baseband video signal VIDEO with the picture carrier signal to produce an output picture signal P. The mixer output signal P is filtered by a vestigial sideband filter (VSB) 60 and coupled to a second input of a frequency interleaver 70 as signal P'. The picture carrier frequency $f_P$ is approximately 1 MHz greater than the data carrier frequency $f_D$.

VSB 60 is used to condition the television signal prior to inserting a data carrier into the lower VSB region of the television signal. VSB filter 60 is a band pass filter having a lower bandedge selected to remove video spectral components from a portion of the lower vestigial sideband of picture signal P, and an upper bandedge selected to remove out-of-band frequency components, such as image frequency components produced by mixer 20. Specifically, VSB filter 60 is a special purpose vestigial sideband filter having a lower bandedge that begins rolling off at approximately 0.5 MHz below the picture carrier frequency $f_P$, and that fully attenuates frequency components more than approximately 1.0 MHz below the picture carrier frequency $f_P$. VSB filter 60 is preferable constructed as a surface acoustic wave (SAW) band pass filter. In addition to the above-described lower and upper band-edges, VSB filter 60 includes a spectral boost region within the passband. The spectral boost region will be explained in detail below with respect to FIGS. 3–5.

Frequency interleaver 70 operates in a known manner to insert data signal D into the lower vestigial sideband region of picture signal P' to produce an output signal OUT. Frequency interleaver 70 spectrally adds data carrier D, and the associated data envelope 210, to picture carrier P' and the associated picture envelope. The data envelope extends 0.25 MHz above and below the data carrier. Thus, since the data carrier frequency is approximately 1.0 MHz less than the picture carrier frequency, the data envelope 210 does not impinge upon the picture carrier. The output signal OUT is transmitted in a known manner by a transmitter 80 via, illustratively, an antenna 90.

Figure 3:
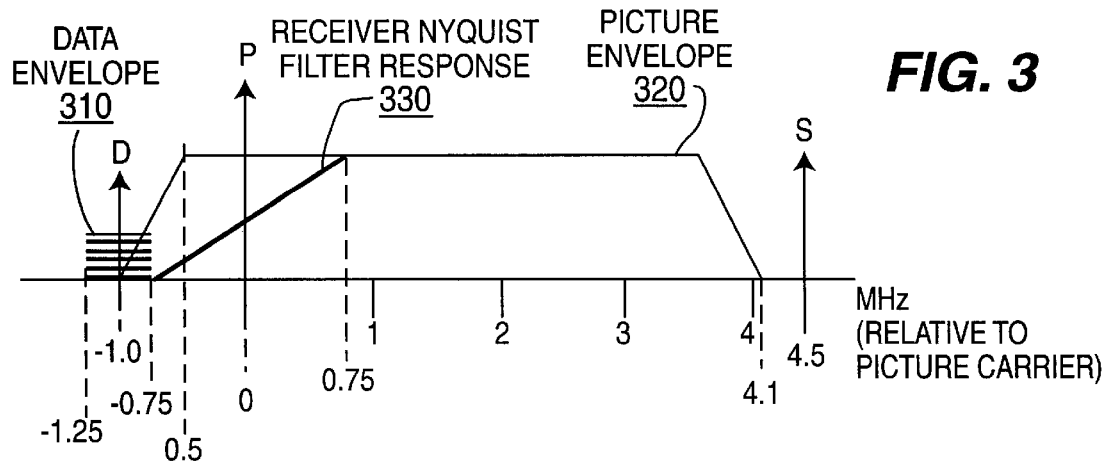
FIG. 3 is a spectral diagram of a television signal having a data carrier located within a vestigial sideband region.

FIG. 3 is a spectral diagram of a television signal having a data carrier D located within a vestigial sideband region. FIG. 3 differs from FIG. 2 in that the lower bandedge of the delineated spectral region denoted as PICTURE ENVELOPE 320 reflects a portion of the operation of VSB filter 60 (i.e., excludes the effect of the spectral boost region). Specifically, the lower bandedge of the PICTURE ENVELOPE 320 of FIG. 3 begins rolling off at 0.5 MHz below the picture carrier frequency $f_P$, and fully attenuates all frequencies more than, approximately, 1.0 MHz below the picture carrier frequency $f_P$. By contrast, the lower bandedge of the PICTURE ENVELOPE 220 depicted in FIG. 2 begins rolling off at 0.75 MHz below the picture carrier frequency $f_P$, and fully attenuates all frequencies more than, approximately, 1.25 MHz below the picture carrier frequency $f_P$.

The inventor has determined that the introduction of video crosstalk into the data signal is greatly reduced by utilizing, e.g., VSB filter 60 to produce the picture envelope as shown in FIG. 3. Unfortunately, modifying the picture envelope in this manner attenuates video information located in the spectral region between 0.5 MHz and 0.75 MHz below the picture carrier.

The attenuated video information mirrors the video information present in the spectral region between 0.5 MHz and 0.75 MHz above the picture carrier. However, since the attenuated video information is normally present in a transmitted television signal, television receiver filters are designed to filter received television signals that include the attenuated video information. Thus, the television receiver filter characteristically, but undesireably, over-attenuates the received television signal. In addition, the group delay response of the received signal is adversely affected.

The inventor has determined that any distortion of an image resulting from a received television signal exhibiting the characteristics depicted in FIG. 3 will be negligible. However, the transmission of such a signal violates standards promulgated by the Federal Communications Commission (FCC) and the National Association of Broadcasters (NAB). Therefore, the inventor has determined that it is necessary to adjust the transmitted television signal to compensate for the video information attenuated by the lower bandedge of VSB filter 60.

Figure 4:
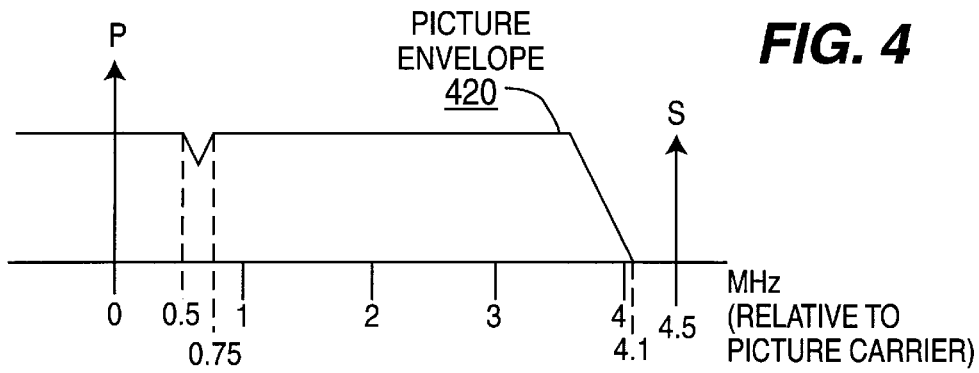
FIG. 4 is a partial spectral diagram of the television signal of FIG. 3 after processing by a standard television receiver.

FIG. 4 is a partial spectral diagram of the television signal of FIG. 3 after processing by a standard television receiver. The receiver VSB filter characteristics described above result in, illustratively, a 0.2 dB to 0.3 dB attenuation of frequencies between 0.5 MHz and 0.75 MHz above the picture carrier P.

Figure 5:
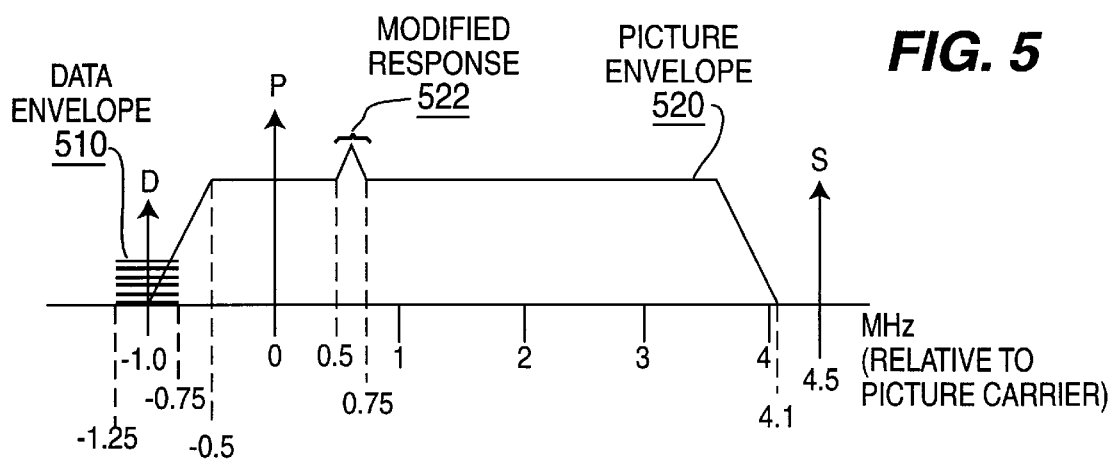
FIG. 5 is a spectral diagram of television signal having a data carrier located within a vestigial sideband region and according to the invention.

FIG. 5 is a spectral diagram of a television signal having a data carrier located within a vestigial sideband region and according to the invention. Specifically, the delineated picture envelope of FIG. 5 includes a portion, denoted as MODIFIED RESPONSE 522, that graphically illustrates the necessary gain compensation for a transmitted television signal according to the invention. One skilled in the art, and having knowledge of the teachings of this invention, will recognize that a corresponding phase compensation is also desirable.

Figure 6:
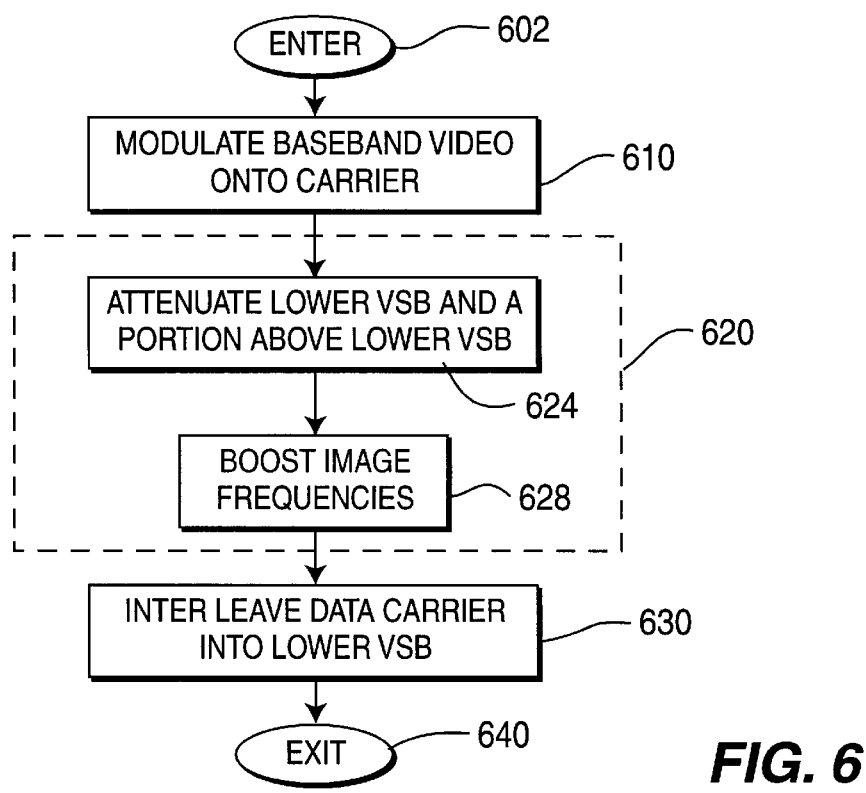
FIG. 6 is a flow diagram of a video signal conditioning routine suitable for use in the apparatus of FIG. 1.

FIG. 6 is a flow diagram of a video signal conditioning routine 600 suitable for use in the apparatus of FIG. 1. The routine 600 is entered at step 605 an proceeds to step 610. At step 610 a baseband video signal is modulated onto a carrier signal. Illustratively, the output signal VIDEO of baseband video source 30 is modulated onto a carrier signal $f_P$ by second mixer 50. The routine then proceeds to step 620, where the carrier modulated signal P is conditioned.

The carrier modulated signal P is conditioned by attenuating (step 624), using a single filter such as VSB filter 60, video frequency components in at least a lower VSB portion of a standard video signal, including video frequency components having image frequency components spectrally located within an attenuation band of a standard television receiver Nyquist filter 624). Such frequency components are lower than the picture carrier frequency.

The carrier modulated signal P is also conditioned by boosting (step 628) image frequency components associated with frequency components attenuated in step 624, where the boosted image frequency components are spectrally located within an attenuation band of a standard television receiver Nyquist filter by an amount proportional to the attenuation by the Nyquist filter.

The routine 600 then proceeds to step 630, where a data signal, illustratively a QPSK-modulated data signal having a carrier frequency 1.0 MHz below the picture carrier frequency, is spectrally interleaved with the conditioned video signal to produce a video signal having a data signal spectrally located in the lower VSB region. The routine 600 is then exited at step 640.

Referring to FIG. 1, an optional video boost circuit 40 may provide the necessary gain compensation by boosting a portion of the baseband video signal VIDEO. Specifically, optional video boost circuit 40 comprises a band pass filter (BPF) 42 that increases the magnitude of the signal at frequencies between 0.5 MHz and 0.75 MHz. The output of BPF 42 is added to the video signal VIDEO by an adder 44 to produce a video signal having enhanced video information in the 0.5 MHz to 0.75 MHz spectral region. The response of BPF 42 is selected to produce a gain compensation in the video signal which substantially compensates for at least the gain error caused by the television receiver Nyquist filter.

The above-described baseband video boosting technique provides the necessary compensation, but at the expense of added components. A more desirable alternative is to modify the transfer response of VSB filter 60. In this manner, the gain may be compensated without additional circuitry. Therefore, and as previously described, VSB filter 60 includes a spectral boost region within the passband. Specifically, the spectral boost region is in the 0.5 MHz to 0.75 MHz spectral regions of the passband, thereby enhancing the video information normally enhanced by image frequency components of lower VSB video information.

The inventor has determined that the use of VSB filter 60 in the above described manner greatly increases the signal to noise ratio of data transmitted within the lower VSB region of a television signal. Moreover, VSB filter 60 may be constructed in a manner similar to that used to construct standard television VSB filters. Special VSB filter 60 differs from standard television VSB filters in that the special VSB filter 60 utilizes a spectrally greater lower bandedge, and includes the above-described spectral boost region. The inventors believe that the use of the special VSB filter 60, as described above, will have a negligible price impact, even when incorporating phase compensation features.

Thus, the inventors have been able to implement a lower vestigial sideband data broadcast arrangement having higher signal to noise ratio and lower costs that arrangements known heretofore.

Although various embodiments which incorporate the teachings of the present invention have been shown and described in detail herein, those skilled in the art can readily devise many other varied embodiments that still incorporate these teachings.

What is claimed is:

1. Apparatus for including a data signal within a lower vestigial sideband (VSB) of a standard video signal prior to transmission of said standard video signal, said apparatus comprising:

a video filter, for attenuating video components in at least said lower VSB portion of said standard video signal, said attenuated video components including video components having image frequencies spectrally located within an attenuation band of a standard television receiver Nyquist filter, said video filter boosting said image frequencies by an amount proportional to said attenuation by said standard television receiver Nyquist filter; and a frequency interleaver, coupled to said video filter, for spectrally adding a data carrier to said lower VSB of said standard video signal.

2. The apparatus of claim 1, wherein said lower VSB region nominally extends from −1.25 MHz to −0.75 MHz relative to said picture carrier frequency, and said filter attenuates frequencies of −1.25 MHz to approximately −0.50 MHz relative to said picture carrier frequency.

3. The apparatus of claim 2, wherein said video filter boosts frequencies of approximately +0.50 MHz to approximately +0.75 MHz relative to said picture carrier frequency.

4. The apparatus of claim 1, wherein said video filter is a surface acoustic wave filter.

5. A method for including a data signal within a lower vestigial sideband (VSB) of a standard video signal prior to transmission of said standard video signal, said method comprising the steps of:

attenuating, using a video filter, video frequency components in at least said lower VSB portion of said standard video signal, said attenuated video frequency components including video frequency components having image frequency components spectrally located within an attenuation band of a standard television receiver Nyquist filter;

boosting, using said video filter, said image frequency components by an amount proportional to said attenuation by said standard television receiver Nyquist filter; and spectrally adding a data carrier to said lower VSB of said standard video signal.

6. The method of claim 5, wherein said lower VSB region nominally extends from −1.25 MHz to −0.75 MHz relative to said picture carrier frequency, and said attenuated frequencies comprise frequencies of approximately −1.25 MHz to approximately −0.50 MHz relative to said picture carrier frequency.

7. The method of claim 6, wherein said boosted frequencies comprise frequencies of approximately +0.50 MHz to approximately +0.75 MHz relative to said picture carrier frequency.

\* \* \* \* \*